United States Patent
Lei

(10) Patent No.: US 10,257,850 B2
(45) Date of Patent: Apr. 9, 2019

(54) DYNAMIC TDD UL/DL CONFIGURATION INDICATION FOR TDD EIMTA IN CARRIER AGGREGATION

(71) Applicant: NOKIA TECHNOLOGIES OY, Espoo (FI)

(72) Inventor: Haipeng Lei, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 34 days.

(21) Appl. No.: 15/024,202

(22) PCT Filed: Sep. 10, 2014

(86) PCT No.: PCT/FI2014/050687
§ 371 (c)(1),
(2) Date: Mar. 23, 2016

(87) PCT Pub. No.: WO2015/044513
PCT Pub. Date: Apr. 2, 2015

(65) Prior Publication Data
US 2016/0219613 A1    Jul. 28, 2016

Related U.S. Application Data

(60) Provisional application No. 61/883,453, filed on Sep. 27, 2013.

(51) Int. Cl.
*H04W 72/12* (2009.01)
*H04L 1/00* (2006.01)
(Continued)

(52) U.S. Cl.
CPC ....... *H04W 72/1263* (2013.01); *H04L 1/0077* (2013.01); *H04L 5/14* (2013.01);
(Continued)

(58) Field of Classification Search
None
See application file for complete search history.

(56) References Cited

U.S. PATENT DOCUMENTS 9,549,395 B2 * 1/2017 Lee ............... H04W 72/042
2012/0320806 A1  12/2012 Ji et al.
(Continued)

FOREIGN PATENT DOCUMENTS

WO    2009/135193 A1    11/2009
WO    2011/032035 A2    3/2011
(Continued)

OTHER PUBLICATIONS

International Search Report and Written Opinion dated Oct. 30, 2014, issued in corresponding International Application No. PCT/FI2014/050687.
(Continued)

*Primary Examiner* — Bunjob Jaroenchonwanit
(74) *Attorney, Agent, or Firm* — Squire Patton Boggs (US) LLP

(57) ABSTRACT

Systems, methods, apparatuses, and computer program products for time division duplex (TDD) uplink/downlink (UL/DL) configuration indication for TDD interference management and traffic adaptation (eIMTA) are provided. One method includes providing, by a network node, a time division duplex (TDD) uplink/downlink (UL/DL) configuration indication pattern. The TDD UL/DL configuration indication pattern may be used to indicate multiple TDD UL/DL configurations in DCI format C associated with the certain configured carriers and the concrete fixed downlink subframe index.

17 Claims, 4 Drawing Sheets

(51) Int. Cl.
  *H04L 5/14* (2006.01)
  *H04W 72/04* (2009.01)
  *H04L 5/00* (2006.01)
  *H04W 72/00* (2009.01)

(52) U.S. Cl.
  CPC ..... *H04W 72/042* (2013.01); *H04W 72/0446* (2013.01); *H04L 1/003* (2013.01); *H04L 5/001* (2013.01); *H04W 72/00* (2013.01)

(56) References Cited

U.S. PATENT DOCUMENTS

| | | | |
|---|---|---|---|
| 2013/0194931 A1* | 8/2013 | Lee | H04L 5/0053 370/241 |
| 2014/0086173 A1* | 3/2014 | Sadeghi | H04L 5/005 370/329 |
| 2014/0119264 A1* | 5/2014 | Shauh | H04W 72/005 370/312 |
| 2014/0126434 A1* | 5/2014 | Li | H04L 5/14 370/280 |
| 2015/0055524 A1* | 2/2015 | Sirotkin | H04W 76/048 370/280 |
| 2015/0282134 A1* | 10/2015 | Suzuki | H04L 5/0044 370/329 |
| 2015/0358998 A1* | 12/2015 | Golitschek Edler Von Elbwart | H04W 48/16 370/280 |
| 2016/0021558 A1* | 1/2016 | Kim | H04L 5/001 455/67.11 |
| 2016/0037492 A1* | 2/2016 | Xu | H04L 5/14 370/280 |
| 2016/0205669 A1* | 7/2016 | Kusashima | H04W 72/042 370/280 |
| 2016/0242153 A1* | 8/2016 | Chen | H04L 5/0098 |
| 2016/0309461 A1* | 10/2016 | Yin | H04W 52/22 |
| 2016/0373281 A1* | 12/2016 | Ji | H04B 7/2656 |
| 2017/0026944 A1* | 1/2017 | Li | H04L 5/1469 |

FOREIGN PATENT DOCUMENTS

| | | |
|---|---|---|
| WO | 2011/035420 A1 | 3/2011 |
| WO | WO 2013/005970 A2 | 1/2013 |
| WO | 2013/025145 A1 | 2/2013 |
| WO | 2013/112372 A1 | 8/2013 |

OTHER PUBLICATIONS

Qualcomm Incorporated, "Signaling Mechanisms for TDD UL-DL Reconfiguration", 3 GPP TSG-RAN WG1 #74, R1-133581, Aug. 19-23, 2013, pp. 1-4.
Japanese Notification of Ground of Rejection application No. 2016-516989 dated Mar. 29, 2017.
Supplementary European Search Report dated Jun. 16, 2017 corresponding to European Patent Application No. 14850000.2.
Ericsson et al., "Different TDD configurations in inter-band CA," 3GPP Draft; R2-120465, 3GPP TSG-RAN WG2 #77, Dresden, Germany, Feb. 6-10, 2012, Jan. 31, 2012, XP050565401.

* cited by examiner

DYNAMIC TDD UL/DL CONFIGURATION INDICATION FOR TDD EIMTA IN CARRIER AGGREGATION

CROSS-REFERENCE TO RELATED APPLICATIONS

This application claims priority from U.S. Provisional Application No. 61/883,453, filed on Sep. 27, 2013. The entire contents of this earlier filed application is hereby incorporated by reference in its entirety.

BACKGROUND

Field

Embodiments of the invention generally relate to mobile communications networks, such as, but not limited to, the Universal Mobile Telecommunications System (UMTS) Terrestrial Radio Access Network (UTRAN), Long Term Evolution (LTE) Evolved UTRAN (E-UTRAN), and/or LTE-A.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Further releases of 3GPP LTE (e.g., LTE Rel-10, LTE Rel-11, LTE Rel-12) are targeted towards future international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

SUMMARY

One embodiment is directed to a method that includes providing, by a network node, a time division duplex (TDD) uplink/downlink (UL/DL) configuration indication pattern for indicating multiple TDD UL/DL configurations in DCI format 1C associated with the certain configured carriers and the concrete fixed downlink subframe index.

In an embodiment, the DCI format 1C in a fixed downlink subframe is used to indicate multiple TDD UL/DL configurations for the associated certain configured carriers.

According to one embodiment, up to five carriers can be supported in DCI format 1C in one or several fixed downlink subframes. In one embodiment, at least one of downlink subframe #0, #1, #5, or #6 indicates the TDD UL/DL configurations for all of the configured carriers.

In an embodiment, the configuration indication pattern comprises a mapping relationship between the TDD UL/DL configurations in one DCI format 1C in one fixed downlink subframe and the carrier index. According to one embodiment, the configuring may comprise configuring TDD UL/DL configuration indication pattern using radio resource control (RRC) signaling.

Another embodiment is directed to an apparatus that includes at least one processor and at least one memory including computer program code. The at least one memory and computer program code are configured, with the at least one processor, to cause the apparatus at least to provide a time division duplex (TDD) uplink/downlink (UL/DL) configuration indication pattern for indicating multiple TDD UL/DL configurations in DCI format 1C associated with the certain configured carriers and the concrete fixed downlink subframe index.

Another embodiment is directed to an apparatus that includes providing means for providing a time division duplex (TDD) uplink/downlink (UL/DL) configuration indication pattern in RRC signaling. The TDD UL/DL configuration indication pattern is used to indicate multiple TDD UL/DL configurations in DCI format 1C associated with the certain configured carriers and the concrete fixed downlink subframe index.

In an embodiment, the DCI format 1C in a fixed downlink subframe is used to indicate multiple TDD UL/DL configurations for associated certain configured carriers.

According to one embodiment, up to five carriers can be supported in DCI format 1C in one or several fixed downlink subframes. In one embodiment, at least one of downlink subframe #0, #1, #5, or #6 indicates the TDD UL/DL configurations for all of the configured carriers.

In an embodiment, the configuration indication pattern comprises a mapping relationship between the TDD UL/DL configurations in one DCI format 1C in one fixed downlink subframe and the carrier index. According to one embodiment, the providing means may comprise means for configuring TDD UL/DL configuration indication pattern using radio resource control (RRC) signaling.

Another embodiment is directed to a computer program, embodied on a computer readable medium, the computer program, when run on a processor, may perform a process that includes providing a time division duplex (TDD) uplink/downlink (UL/DL) configuration indication pattern for indicating multiple TDD UL/DL configurations in DCI format 1C associated with the certain configured carriers and the concrete fixed downlink subframe index.

Another embodiment is directed to a method that includes receiving, by a network node, a time division duplex (TDD) uplink/downlink (UL/DL) configuration indication pattern for indicating multiple TDD UL/DL configurations in DCI format 1C associated with the certain configured carriers and the concrete fixed downlink subframe index.

Another embodiment is directed to an apparatus that includes at least one processor and at least one memory including computer program code. The at least one memory and computer program code are configured, with the at least one processor, to cause the apparatus at least to receive a time division duplex (TDD) uplink/downlink (UL/DL) configuration indication pattern for indicating multiple TDD UL/DL configurations in DCI format 1C associated with the certain configured carriers and the concrete fixed downlink subframe index.

Another embodiment is directed to an apparatus that includes receiving means for receiving a time division duplex (TDD) uplink/downlink (UL/DL) configuration indication pattern in RRC signaling. The TDD UL/DL configuration indication pattern is used to indicate multiple TDD UL/DL configurations in DCI format 1C associated with the certain configured carriers and the concrete fixed downlink subframe index.

Another embodiment is directed to a computer program, embodied on a computer readable medium, the computer program, when run on a processor, may perform a process that includes receiving a time division duplex (TDD) uplink/downlink (UL/DL) configuration indication pattern for indicating multiple TDD UL/DL configurations in DCI format 1C associated with the certain configured carriers and the concrete fixed downlink subframe index.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for time division duplex (TDD) uplink/downlink (UL/DL) configuration indication for TDD enhancement for DL-UL interference management and traffic adaptation (eIMTA), as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to Rel-12 Work Item eIMTA—"Further Enhancements to LTE TDD for DL-UL Interference Management and Traffic Adaptation". A goal of this eIMTA work item is to realize the traffic adaptation to match the uplink and downlink traffic variation.

Figures 1, 2:
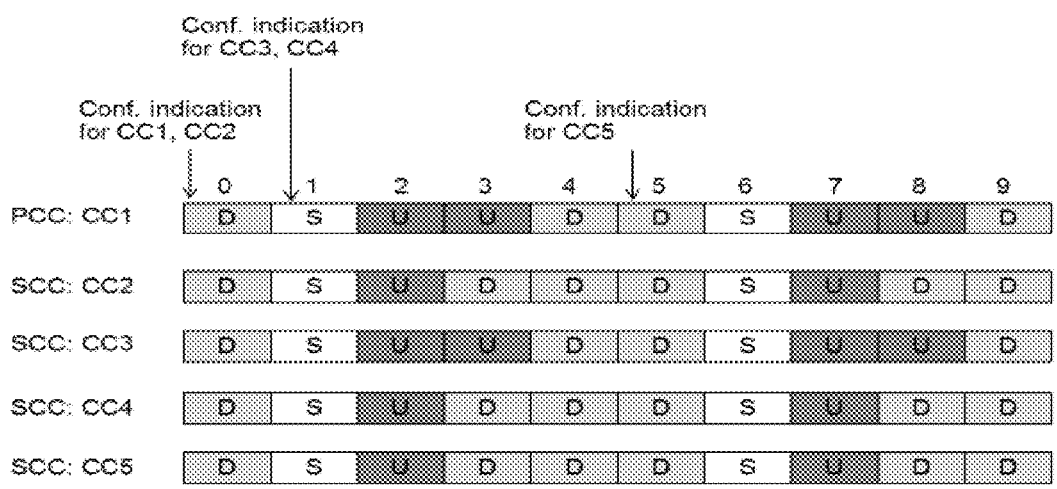
FIG. 1 illustrates the seven existing TDD UL-DL configurations.
FIG. 2 illustrates example configurations for one embodiment.

Currently, LTE TDD allows for asymmetric UL-DL allocations by providing seven different TDD UL-DL configurations, as illustrated in FIG. 1. As illustrated in FIG. 1, subframes shown as "D" are downlink, subframes shown as "U" are uplink, and subframes shown as "S" are special. In particular, "S" is a special subframe including downlink pilot time slot (DwPTS), guard period (GP) and uplink pilot time slot (UpPTS). DwPTS can be used to transmit DL physical downlink shared channel (PDSCH). UpPTS can be used to transmit short random access channel (RACH) or sounding reference signal (SRS). GP is the switching gap from transmission to reception.

The allocations depicted in FIG. 1 can provide between 40% and 90% DL subframes. For example, if a special subframe is seen as a DL subframe, then UL-DL configuration 0 provides 4 DL subframes and 6 UL subframes. So the DL resource ratio is 40%. Similarly, it is 90% for UL-DL configuration 5.

A current mechanism for adapting UL-DL allocation is based on the system information change procedure with a 640 ms period. The concrete TDD UL/DL configuration is semi-statically informed by system information block 1 (SIB-1) signaling.

One of the objectives of TDD eIMTA is to provide a signaling mechanism to indicate the TDD UL-DL configuration and guarantee backward compatibility. As shown in FIG. 1 discussed above, UE-common downlink control information (DCI) is agreed for UL/DL reconfiguration indication. Upon detection of this UE-common DCI, UE shall know the TDD UL/DL configuration for current radio frame or the next radio frame of serving cell. Additionally, in order for UE to know the TDD UL/DL reconfiguration set, radio resource control (RRC) signaling can be used due to this reconfiguration set being semi-statically configured. However, one of the remaining issues is to define the exact content for UE-group-common downlink control information (DCI). Assuming that the UL-DL reconfiguration indication is transmitted via the common search space, and the amount of UE blind decoding is kept unchanged compared to legacy operation, there are two options available UE-group-common DCI. A first option is to align the size of UE-group-common DCI with the size of DCI format 1C. A second option is to align the size of UE-group-common DCI with the size of DCI format 0/1A/3/3A.

TDD UL/DL reconfiguration set limits the scope of available UL/DL configurations for eNB and UE. It can be indicated by RRC signaling. If eNB determines one UL/DL configuration from this set, it needs to indicate this determined UL/DL configuration to UE in UE-common DCI (e.g., DCI format 1C). For example, this reconfiguration set can be comprised of TDD UL/DL configuration 0, 1, 2 and 6. This set can be indicated by RRC when eIMTA feature is activated or when UE access a cell working in eIMTA mode. Then UE may also need to receive the UE-common DCI to know the concrete UL/DL configuration.

The payload of DCI format 1C depends on operated system bandwidth and varies between 8 and 15 bits (excluding CRC bits). It is noted that this is clearly enough for conveying the UL-DL configuration indicators for up to two configured carriers in case of carrier aggregation. However, it may not be enough to support carrier aggregation for up to five carriers. The payload of DCI format 0/1A/3/3A varies between 21 and 28 bits (excluding CRC bits), which can support the UL-DL configuration indication for up to five carriers. The main difference between the two options is that DCI format 1C has about 1.5 dB better link performance (coverage) compared to DCI format 0/1A/3/3A. Furthermore, detection reliability is of importance and for that reason the first option (i.e., format 1C) may be preferred.

Therefore, certain embodiments of the invention focus on the UL/DL configuration indication for TDD eIMTA by means of DCI format 1C in case of carrier aggregation. However, embodiments of the invention are not limited only to DCI format 1C. Other DCI formats (e.g., DCI format 0/1A/3/3A) may also be included according to certain embodiments.

Certain embodiments provide several schemes for TDD UL/DL configuration indication for TDD eIMTA, for example, when the number of configured carriers is equal to one or more than one.

In a first embodiment, radio resource control (RRC) signaling is provided to configure a TDD UL/DL configuration indication pattern (CIP), which is used to indicate multiple TDD UL/DL configurations in DCI format 1C associated with the certain configured carriers and the concrete fixed downlink subframe index. Considering at least two TDD UL/DL configurations can be indicated in one DCI format 1C and up to 5 carriers can be configured, this CIP pattern includes the mapping relationship between the TDD UL/DL configurations in one DCI format 1C in one fixed downlink subframe and the carrier index.

In a second embodiment, RRC signaling is provided to configure the dynamic UL/DL reconfiguration set by indicating a 7-bit field. According to this embodiment, each bit may correspond to a TDD UL/DL configuration number with ascending order from TDD UL/DL configuration 0 to 6, which indicates whether the corresponding TDD UL/DL configuration can be used for traffic adaptation (e.g., "0": not used; "1": used). In this example, the criteria for this dynamic UL/DL reconfiguration indication may be dependent on the below equation:

$$\left\lceil \log_2 \sum_{i=1}^{7} n_i \right\rceil \times M \leq X,$$

where, i is the index for the bit field from 1 to 7 and $n_i$ is the binary value of ith bit. M is the number of configured carriers and M≤5. X is the payload size of DCI format 1C dependent on the operated bandwidth. Based on this, DCI format 1C can be transmitted in one fixed downlink subframe in common search space and indicate a concatenation of multiple TDD UL/DL configurations associated with a certain configured carriers.

In a third embodiment, a formulation is used to derive the mapping relationship between TDD UL/DL configurations and the associated carrier. This formulation can be specified in the standard and both eNB and UE should implement it with the same rule. Considering that the payload size of DCI format 1C is dependent on the operated bandwidth, the number of needed fixed downlink subframes (e.g., Y) can be set to $$Y = \left\lceil \frac{M}{\lfloor X/3 \rfloor} \right\rceil.$$

Based on this, in one radio frame, DL subframe#$k_n$ (K={0, 1,5,6}, n=0,1,2,3) is used to transmit TDD UL/DL configurations associated to certain carriers with ascending carrier index. In particular, DCI format 1C in DL subframe#$k_n$ may be used to transmit multiple TDD UL/DL configurations associated to $CC_{n \times \lfloor X/3 \rfloor +1}$, $CC_{n \times \lfloor X/3 \rfloor +2}$, ..., $CC_{n \times \lfloor X/3 \rfloor + \lfloor X/3 \rfloor}$. If DCI format 1C in DL subframe#$k_n$ is not enough to indicate the TDD UL/DL configurations associated to remaining carriers then DCI format 1C in DL subframe#$k_{n+1}$ may be used until TDD UL/DL configurations for all the configured carriers can be indicated. In this way, TDD UL/DL configuration for each carrier can be indicated in one radio frame by DCI format 1C.

In a fourth embodiment, a formulation is used to derive the mapping relationship between TDD UL/DL configurations of all configured carriers and the time scale information. This formulation can be specified in the standard and both the eNB and UE should implement it with the same rule. The time scale is the dynamic UL/DL reconfiguration period and TDD UL/DL configuration is kept unchanged in this period. Usually it is equal to one or several radio frames. The time scale information may need to be indicated to the UE according to the number of configured carriers. The formulation may be specified in the standard and both the eNB and UE should implement it with the same rule. The number of configured carriers (e.g., $CC_1$, $CC_2$, ..., $CC_M$, M≤5) is equal to the time scale (e.g., Y radio frames) for TDD eIMTA. When the certain radio frame satisfies SFN mod Y==m, TDD UL/DL configuration in DCI format 1C is associated to $CC_{m+1}$, where m is the remainder of SFN divided by Y. In this way, the TDD UL/DL configuration for each carrier can be indicated in different radio frame within one dynamic UL/DL reconfiguration period. Alternatively, considering that the payload size of DCI format 1C is dependent on the operated bandwidth, the time scale (e.g., Y radio frames) can be set to $$Y = \left\lceil \frac{M}{\lfloor X/3 \rfloor} \right\rceil.$$

In this way, when the certain radio frame satisfies SFN mod Y==m, TDD UL/DL configuration in DCI format 1C is associated to $CC_{m \times \lfloor X/3 \rfloor +1}$, $CC_{m \times \lfloor X/3 \rfloor +2}$, ..., $CC_{m \times \lfloor X/3 \rfloor + \lfloor X/3 \rfloor}$.

As mentioned above, in LTE TDD, seven TDD UL/DL configurations have been specified since Release 8. These configurations can provide between 40% and 90% DL subframes. However, some configurations can provide quite similar DL/UL ratio. For example, both TDD UL/DL configuration 2 and 4 can provide the DL ratio of 80%. On the other hand, if all seven TDD UL/DL configurations are dynamically selected for reconfiguration, then HARQ timing in DL or UL and PUSCH transmission or retransmission timing may be complicated when one TDD UL/DL configuration is changed to another with different switching points. In this aspect, more standardization effort is needed for solving the timing issues.

A UE configured for carrier aggregation (CA) can be configured to monitor the common search space (CSS) on the primary cell (PCell) for reconfiguration of the UL/DL configuration of any configured serving cell. If it is assumed that all serving cells have the same reconfiguration time scale, then 15 bits are required to indicate reconfiguration for up to five configured serving cells. This would not be possible with DCI Format 1C given the limited payload size as shown in Table 1 for the six LTE system bandwidths.

TABLE 1

DCI Format 1C Payload Size

| | System bandwidth (MHz) | | | | | |
|---|---|---|---|---|---|---|
| | 1.4 | 3 | 5 | 10 | 15 | 20 |
| DCI 1C payload size | 8 | 10 | 12 | 13 | 14 | 15 |
| Number of associated carriers can be indicated in one DCI format 1C | 2 | 3 | 4 | 4 | 4 | 5 |

As introduced above, according to the first embodiment, the principle is to predefine a pattern to explicitly show the mapping relationship of which fixed downlink subframe in PCell shall be used to transmit the TDD UL/DL configuration indication associated to which carrier(s) according to the payload size of DCI format 1C and the number of configured carriers. RRC signaling is provided to configure a TDD UL/DL configuration indication pattern (CIP), which is used to indicate multiple TDD UL/DL configurations in DCI format 1C associated with the certain configured carriers and the concrete fixed downlink subframe index. Considering at least two TDD UL/DL configurations can be indicated in one DCI format 1C and up to 5 carriers can be configured, this CIP pattern includes the mapping relationship between the TDD UL/DL configurations in one DCI format 1C in one fixed downlink subframe and the carrier index. One example is illustrated in Table 2 below. Table 2 maps the TDD UL/DL configurations for specific carriers to a certain fixed downlink subframe in PCC, i.e., TDD UL/DL configurations for CC1 and CC2 are transmitted in DL subframe 0 in PCC, TDD UL/DL configurations for CC3 and CC4 are transmitted in DL subframe 1 in PCC, and TDD UL/DL configuration for CC5 is transmitted in DL Subframe 5 in PCC.

TABLE 2

| Configuration indication pattern | | | | | |
|---|---|---|---|---|---|
| | CC1 | CC2 | CC3 | CC4 | CC5 |
| DL Subframe 0 | ✓ | ✓ | — | — | — |
| DL Subframe 1 | — | — | ✓ | ✓ | — |
| DL Subframe 5 | — | — | — | — | ✓ |
| DL Subframe 6 | — | — | — | — | — |

FIG. 2 further illustrates example configurations for the first embodiment. As depicted in FIG. 2, assuming the bandwidth of PCC is 1.4 MHz and the number of configured carriers is 5, DCI format 1C in DL subframe 0 can be used to indicate TDD UL/DL configurations associated to $CC_1$, $CC_2$. DCI format 1C in DL subframe 1 can be used to indicate TDD UL/DL configurations associated to $CC_3$, $CC_4$. DCI format 1C in DL subframe 5 can be used to indicate TDD UL/DL configurations associated to $CC_5$.

In order to improve the robustness of TDD UL/DL configuration indication, the configuration indication pattern can be allowed to repeat the TDD UL/DL configurations for some carriers. One example is shown in Table 3.

TABLE 3

| Configuration indication pattern | | | | | |
|---|---|---|---|---|---|
| | CC1 | CC2 | CC3 | CC4 | CC5 |
| DL Subframe 0 | ✓ | ✓ | — | — | — |
| DL Subframe 1 | — | ✓ | ✓ | — | — |
| DL Subframe 5 | — | — | ✓ | ✓ | — |
| DL Subframe 6 | — | — | — | ✓ | ✓ |

Figure 3:
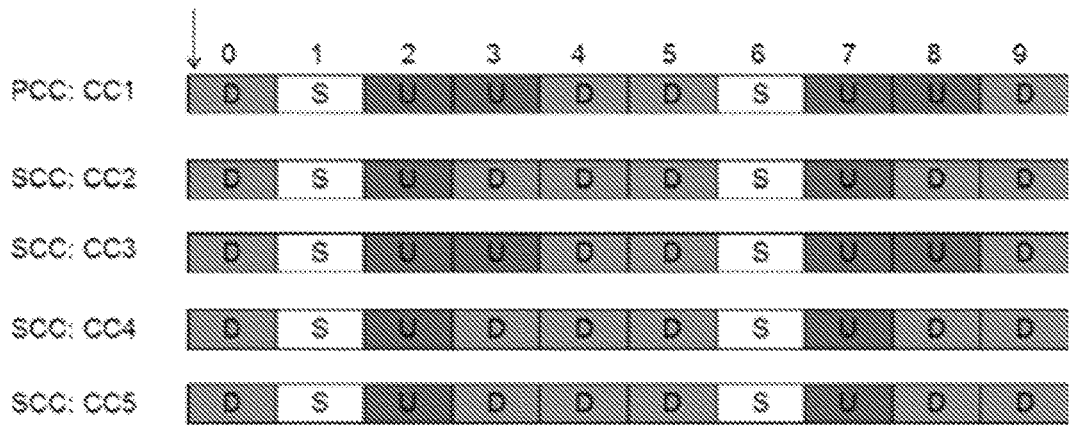
FIG. 3 illustrates example configurations assuming the bandwidth of Primary Component Carrier (PCC) is 20 MHz according to one embodiment.

This CIP pattern is dependent on the bandwidth of PCell. If the bandwidth of PCC is 20 MHz, up to 5 carriers can be supported in one DCI format 1C in one DL subframe. This mapping pattern is illustrated in Table 4 below as an example. FIG. 3 illustrates example configurations assuming the bandwidth of PCC is 20 MHz according to the first embodiment.

TABLE 4

| Configuration indication pattern | | | | | |
|---|---|---|---|---|---|
| | CC1 | CC2 | CC3 | CC4 | CC5 |
| DL Subframe 0 | ✓ | ✓ | ✓ | ✓ | ✓ |
| DL Subframe 1 | — | — | — | — | — |
| DL Subframe 5 | — | — | — | — | — |
| DL Subframe 6 | — | — | — | — | — |

As mentioned above, in the second embodiment, the principle is to allow reduced TDD UL/DL reconfiguration set in order to adapt the payload size of DCI format 1C and the number of configured carriers. RRC signaling is provided to configure the dynamic UL/DL reconfiguration set by indicating a 7-bit field and each bit corresponding to TDD UL/DL configuration number with the ascending order from TDD UL/DL configuration 0 to 6 indicates whether the corresponding TDD UL/DL configuration can be used for traffic adaptation (e.g., "0": not used; "1": used). The criteria for this dynamic UL/DL reconfiguration indication may be dependent on the below equation:

$$\left\lceil \log_2 \sum_{i=1}^{7} n_i \right\rceil \times M \leq X,$$

where, i is the index for the bit field from 1 to 7 and $n_i$ is the binary value of ith bit. M is the number of configured carriers and M≤5. X is the payload size of DCI format 1C dependent on the operated bandwidth.

For example, if the bandwidth is 1.4 MHz and the number of configured carriers is 5, then M=5, X=8. Therefore, the bit field for dynamic UL/DL reconfiguration set signaled by RRC signaling can be "1010000". In that sense, only TDD UL/DL configuration 0 and 2 can be used. Therefore, 1 bit in UE-common DCI for UL/DL configuration indication is enough to indicate the current practical TDD UL/DL configuration. In this manner, one DCI format 1C can be used to indicate the UL/DL configurations for up to five carriers with ascending order. In this embodiment, in addition to the RRC signaling for UL/DL reconfiguration set indication, physical layer signaling (i.e., UE-common DCI) is used to indicate the TDD UL/DL configuration to a group UEs.

As another example, if the bandwidth is 3 MHz and the number of configured carriers is 5, then M=5, X=10. Thus, the bit field for dynamic UL/DL reconfiguration set signaled by RRC signaling can be "1110001". In that sense, only TDD UL/DL configuration 0, 1, 2 and 6 can be used. Then, 2 bits are enough to indicate the current practical TDD UL/DL configuration in UE-common DCI for UL/DL configuration indication. In this way, one DCI format 1C can be used to indicate the UL/DL configurations for up to five carriers with ascending order. In this manner, only one DCI format 1C in DL subframe 0 in PCell is enough to indicate the TDD UL/DL configurations of up to five carriers.

In the third embodiment, formulation may be used to derive the mapping relationship between TDD UL/DL configurations and the associated carrier. The principle of this embodiment is to use a predefined formula to implicitly derive the mapping relationship that which fixed downlink subframe in PCell shall be used to transmit the TDD UL/DL configuration indication associated to which carrier(s) according to the payload size of DCI format 1C and the number of configured carriers. This formulation may need to be specified in the standard and both the eNB and UE should implement it with the same rule. Considering that the payload size of DCI format 1C is dependent on the operated bandwidth, the number of needed fixed downlink subframes (e.g., Y) can be set to $$Y = \left\lceil \frac{M}{\lfloor X/3 \rfloor} \right\rceil.$$

For example, if the bandwidth is 1.4 MHz and the number of configured carriers is 5, then M=5, X=8, Y=3. Based on this, DCI format 1C in DL subframe 0 is used to transmit two TDD UL/DL configurations associated to $CC_1$, $CC_2$. DCI format 1C in DL subframe 1 is used to indicate two TDD UL/DL configurations associated to $CC_3$, $CC_4$. DCI format 1C in DL subframe 5 is used to indicate TDD UL/DL configuration associated to $CC_5$. In this manner, TDD UL/DL configuration for each carrier can be indicated in one radio frame by DCI format 1C.

As introduced above, in the fourth embodiment, the time scale information indicates to the UE according to the number of configured carriers. The principle of this embodiment is to use a predefined formula to implicitly derive the mapping relationship that in which radio frame one predefined fixed downlink subframe in PCell shall be used to transmit the TDD UL/DL configuration indication associated to which carrier(s) according to the number of configured carriers and/or the payload size of DCI format 1C. This predefined fixed downlink subframe in PCell and the time scale for UL/DL reconfiguration can be indicated to UE by RRC signaling. The formulation may need to be specified in the standard and both the eNB and UE should implement it with the same rule. The number of configured carriers (e.g., $CC_1$, $CC_2$, ..., $CC_M$, M≤5) is equal to the time scale (e.g., Y radio frames) for TDD eIMTA. When the certain radio frame satisfies SFN mod Y==m, TDD UL/DL configuration in DCI format 1C is associated to $CC_{m+1}$.

Figure 4:
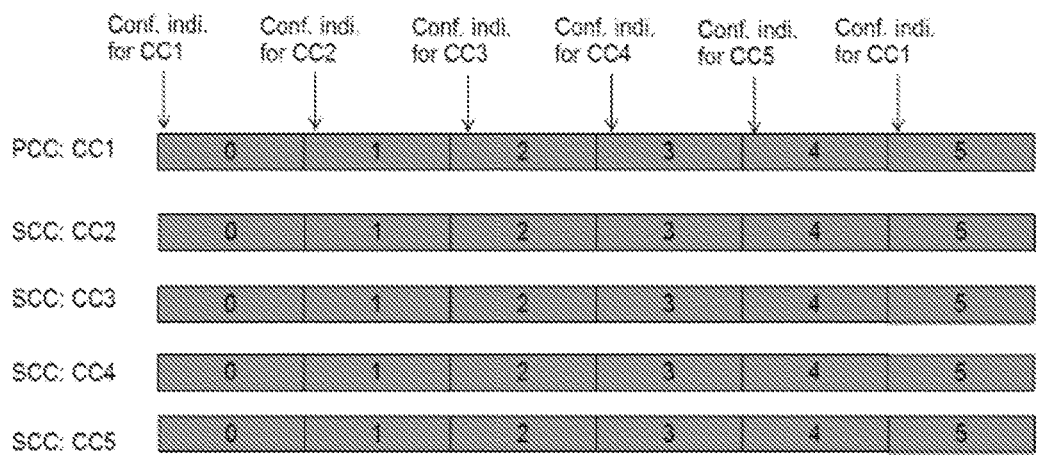
FIG. 4 illustrates an example embodiment in which the bandwidth is 1.4 MHz and the number of configured carriers is 5.

FIG. 4 illustrates an example according to the fourth embodiment in which, when the bandwidth is 1.4 MHz and the number of configured carriers is 5, then M=5, Y=5. Based on this, when the certain radio frame satisfies SFN mod 5==0, TDD UL/DL configuration in DCI format 1C is associated to $CC_1$; ...; when the certain radio frame satisfies SFN mod 5==4, TDD UL/DL configuration in DCI format 1C is associated to $CC_5$.

Alternatively, considering that the payload size of DCI format 1C is dependent on the operated bandwidth, the time scale (e.g., Y radio frames) can be set to $$Y = \left\lceil \frac{M}{\lfloor X/3 \rfloor} \right\rceil_{=3}.$$

Based on this, DCI format 1C in the radio frame satisfying SFN mod 3==0 may be used to transmit two TDD UL/DL configurations associated to $CC_1$, $CC_2$. DCI format 1C in the radio frame satisfying SFN mod 3==1 may be used to indicate two TDD UL/DL configurations associated to $CC_3$, $CC_4$. In addition, DCI format 1C in the radio frame satisfying SFN mod 3==2 may be used to indicate TDD UL/DL configuration associated to $CC_5$.

Figure 5:
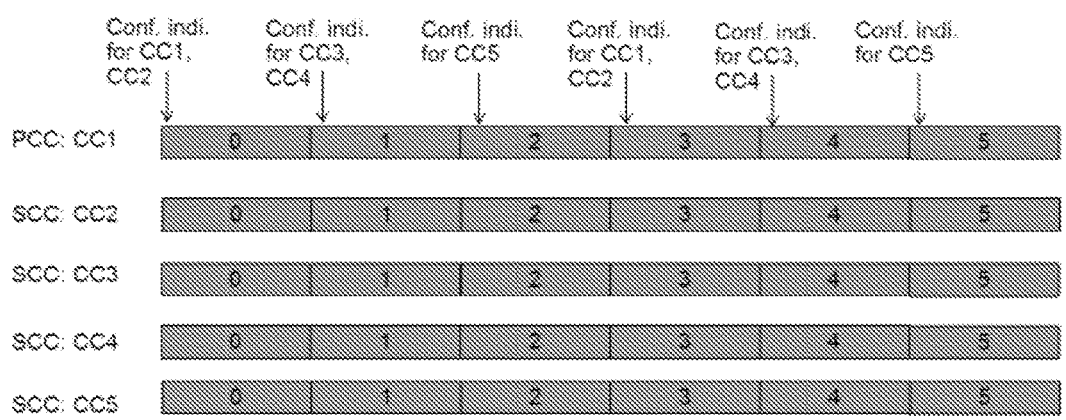
FIG. 5 illustrates an example where 5 carriers are configured and DCI format 1C may be used to indicate the TDD UL/DL configuration.

FIG. 5 illustrates another example where 5 carriers are configured. In this manner, TDD UL/DL configuration for each carrier can be indicated in different radio frame within one dynamic UL/DL reconfiguration period.

Figure 6:
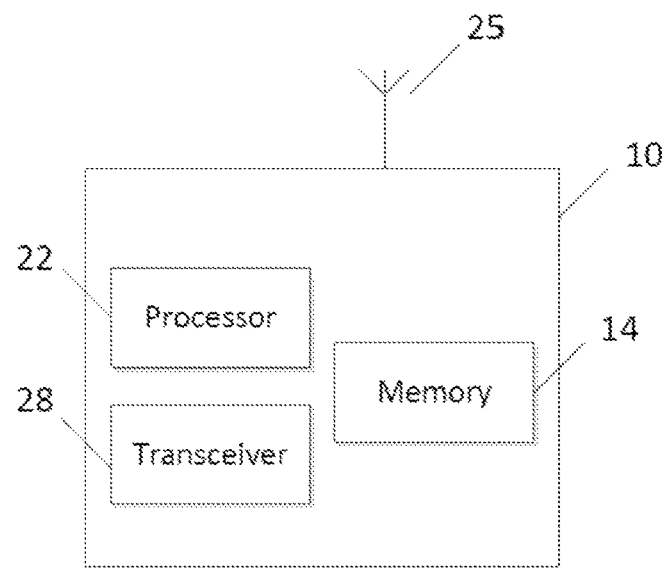
FIG. 6 illustrates an apparatus according to an embodiment.

FIG. 6 illustrates an example of an apparatus 10 according to an embodiment. In one embodiment, apparatus 10 may be a network element, such as a base station or eNB. Further, it should be noted that one of ordinary skill in the art would understand that apparatus 10 may include components or features not shown in FIG. 6. Only those components or features necessary for illustration of the invention are depicted in FIG. 6.

As illustrated in FIG. 6, apparatus 10 includes a processor 22 for processing information and executing instructions or operations. Processor 22 may be any type of general or specific purpose processor. While a single processor 22 is shown in FIG. 6, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a base station in a communications network, such as an eNB in LTE. In an embodiment, apparatus 10 may be controlled by memory 14 and processor 22 to configure, for example using RRC signaling, a TDD UL/DL configuration indication pattern (CIP) that is used to indicate multiple TDD UL/DL configurations in DCI format 1C. The TDD UL/DL configurations may be associated with certain configured carriers and concrete fixed downlink subframe index.

In another embodiment, apparatus 10 may be controlled by memory 14 and processor 22 to configure, for example using RRC signaling, a dynamic UL/DL reconfiguration set by indicating a 7-bit field. Each bit may, for instance, correspond to a TDD UL/DL configuration number. For example, each bit may correspond to a TDD UL/DL configuration with ascending order from TDD UL/DL configuration 0 to 6 indicating whether the corresponding TDD UL/DL configuration can be used for traffic adaptation. According to an embodiment, a criteria for the dynamic UL/DL reconfiguration indication is dependent on the following equation:

$$\left\lceil \log_2 \sum_{i=1}^{7} n_i \right\rceil \times M \leq X$$

where i is the index for the bit field from 1 to 7, $n_i$ is the binary value of ith bit, M is the number of configured carriers and $M \leq 5$, and X is the payload size of DCI format 1C dependent on the operated bandwidth.

In another embodiment, apparatus 10 may be controlled by memory 14 and processor 22 to derive, using a formulation, a mapping relationship between TDD UL/DL configurations and an associated carrier. The TDD UL/DL configurations may be in DCI format 1C and the number of fixed downlink subframes (Y) can be set to $$Y = \left\lceil \frac{M}{\lfloor X/3 \rfloor} \right\rceil.$$

In yet another embodiment, apparatus 10 may be controlled by memory 14 and processor 22 to indicate time scale information to a UE according to the number of configured carriers. According to one example, the number of configured carriers may be equal to the time scale for TDD eIMTA. TDD UL/DL configuration for each carrier can be indicated in one of fixed downlink subframe of PCell in different radio frames within one UL/DL reconfiguration period.

Figure 7:
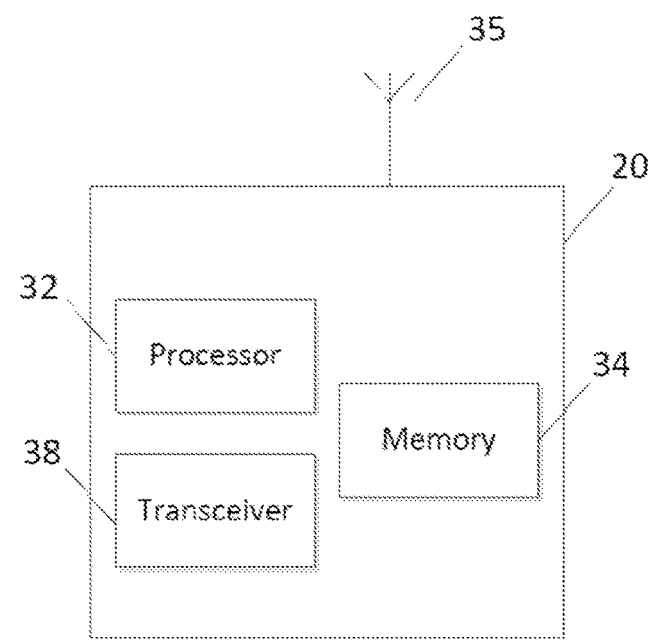
FIG. 7 illustrates an apparatus according to another embodiment.

FIG. 7 illustrates an example of an apparatus 20 according to another embodiment. In an embodiment, apparatus 20 may be a node associated with a communications network, such as mobile station or user equipment (UE). It should be noted that one of ordinary skill in the art would understand that apparatus 20 may include components or features not shown in FIG. 7.

As illustrated in FIG. 7, apparatus 20 includes a processor 32 for processing information and executing instructions or operations. Processor 32 may be any type of general or specific purpose processor. While a single processor 32 is shown in FIG. 7, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be mobile station or UE. In this embodiment, apparatus 20 may be controlled by memory 34 and processor 32 to receive a time division duplex (TDD) uplink/downlink (UL/DL) configuration indication pattern. The TDD UL/DL configuration indication pattern may indicate multiple TDD UL/DL configurations in DCI format 1C associated with certain configured carriers and a concrete fixed downlink subframe index.

Other embodiments may include methods for TDD UL/DL configuration indication for TDD eIMTA. One method includes configuring, for example using RRC signaling, a TDD UL/DL configuration indication pattern (CIP) that is used to indicate multiple TDD UL/DL configurations in DCI format 1C associated with certain configured carriers and concrete fixed downlink subframe index of PCell. Therefore, this embodiment is able to predefine a pattern to explicitly show the mapping relationship for which fixed downlink subframe in PCell shall be used to transmit the TDD UL/DL configuration indication associated to which carrier(s) according to the payload size of DCI format 1C and the number of configured carriers.

Another embodiment is directed to a method that includes configuring, for example using RRC signaling, a dynamic UL/DL reconfiguration set by indicating a 7-bit field. Therefore, this embodiment may allow reduced TDD UL/DL reconfiguration set in order to adapt the payload size of DCI format 1C and the number of configured carriers. Each bit may, for instance, correspond to a TDD UL/DL configuration number. For example, each bit may correspond to a TDD UL/DL configuration with ascending order from TDD UL/DL configuration 0 to 6 indicating whether the corresponding TDD UL/DL configuration can be used for traffic adaptation. According to an embodiment, a criteria for the dynamic UL/DL reconfiguration indication may be dependent on the following equation:

$$\left\lceil \log_2 \sum_{i=1}^{7} n_i \right\rceil \times M \le X$$

where i is the index for the bit field from 1 to 7, $n_i$ is the binary value of ith bit, M is the number of configured carriers and $M \le 5$, and X is the payload size of DCI format 1C dependent on the operated bandwidth.

Another embodiment is directed to a method that includes deriving, using a formulation, a mapping relationship between TDD UL/DL configurations and an associated carrier. The TDD UL/DL configurations may be in DCI format 1C and the number of fixed downlink subframes (Y) can be set to $$Y = \left\lceil \frac{M}{\lfloor X/3 \rfloor} \right\rceil.$$

Therefore, this embodiment can use a predefined formula to implicitly derive the mapping relationship that which fixed downlink subframe in PCell shall be used to transmit the TDD UL/DL configuration indication associated to which carrier(s) according to the payload size of DCI format 1C and the number of configured carriers.

Another embodiment is directed to a method that includes indicating time scale information to a UE according to the number of configured carriers. According to one example, the number of configured carriers may be equal to the time scale for TDD eIMTA. TDD UL/DL configuration for each carrier can be indicated in one of fixed downlink subframe of PCell in different radio frames within one UL/DL reconfiguration period. Therefore, this embodiment can use a predefined formula to implicitly derive the mapping relationship that in which radio frame one predefined fixed downlink subframe in PCell shall be used to transmit the TDD UL/DL configuration indication associated to which carrier(s) according to the number of configured carriers and/or the payload size of DCI format 1C. This predefined fixed downlink subframe in PCell and the time scale for UL/DL reconfiguration can be indicated to UE by RRC signaling.

In some embodiments, the functionality of any of the methods described herein, such as those illustrated in FIG. 4 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method, comprising:
    configuring, by a network node, a time division duplex (TDD) uplink/downlink (UL/DL) configuration indication pattern that is used to indicate multiple TDD UL/DL configurations in DCI format 1C; and
    providing, to at least one user equipment, the TDD UL/DL configuration indication pattern to indicate the multiple TDD UL/DL configurations in DCI format 1C, wherein each of the TDD UL/DL configurations is associated with certain configured carriers and a concrete fixed downlink subframe index,
    wherein the providing further comprising providing the configuration indication pattern comprising a mapping relationship between the TDD UL/DL configurations in one DCI format 1C in one fixed downlink subframe and the carrier index.

2. The method according to claim 1, further comprising indicating in at least one of downlink subframe #0, #1, #5, or #6 the TDD UL/DL configurations for all of the configured carriers.

3. The method according to claim 1, further comprising configuring the TDD UL/DL configuration indication pattern using radio resource control (RRC) signaling.

4. An apparatus, comprising:
at least one processor; and
at least one memory including computer program code,
the at least one memory and computer program code configured, with the at least one processor, to cause the apparatus at least to
configure a time division duplex (TDD) uplink/downlink (UL/DL) configuration indication pattern that is used to indicate multiple TDD UL/DL configurations in DCI format 1C;
provide, to at least one user equipment, the TDD UL/DL configuration indication pattern to indicate the multiple TDD UL/DL configurations in DCI format 1C, wherein each of the TDD UL/DL configurations is associated with certain configured carriers and a concrete fixed downlink subframe index,
wherein the configuration indication pattern comprises a mapping relationship between the TDD UL/DL configurations in one DCI format 1C in one fixed downlink subframe and the carrier index.

5. The apparatus according to claim 4, wherein the at least one memory and computer program code configured, with the at least one processor, to cause the apparatus at least to transmit the DCI format 1C in a fixed downlink subframe is to indicate multiple TDD UL/DL configurations for the associated certain configured carriers.

6. The apparatus according to claim 4, wherein up to five carriers are supported in the DCI format 1C in one or more downlink subframes.

7. A non-transitory computer readable memory embodying at least one computer program code, the at least one computer program code executable by at least one processor to perform a method comprising:
receiving a time division duplex (TDD) uplink/downlink (UL/DL) configuration indication pattern for indicating multiple TDD UL/DL configurations in DCI format 1C, wherein each of the TDD UL/DL configurations is associated with certain configured carriers and a concrete fixed downlink subframe index,
wherein the receiving comprises receiving the configuration indication pattern comprising a mapping relationship between the TDD UL/DL configurations in one DCI format 1C in one fixed downlink subframe and the carrier index.

8. A method, comprising:
receiving, by a network node, a time division duplex (TDD) uplink/downlink (UL/DL) configuration indication pattern for indicating multiple TDD UL/DL configurations in downlink control information (DCI) format 1C, wherein each of the TDD UL/DL configurations is associated with certain configured carriers and a concrete fixed downlink subframe index,
wherein the receiving comprises receiving the configuration indication pattern comprising a mapping relationship between the TDD UL/DL configurations in one DCI format 1C in one fixed downlink subframe and the carrier index.

9. The method according to claim 8, further comprising transmitting the DCI format 1C in a fixed downlink subframe to indicate multiple TDD UL/DL configurations for the associated certain configured carriers.

10. The method according to claim 8, wherein up to five carriers are supported in the DCI format 1C in one or more fixed downlink subframes.

11. The method according to claim 8, further comprising indicating in at least one of downlink subframe #0, #1, #5, or #6 the TDD UL/DL configurations for all of the configured carriers.

12. The method according to claim 8, further comprising configuring the TDD UL/DL configuration indication pattern using radio resource control (RRC) signaling.

13. An apparatus, comprising:
at least one processor; and
at least one memory including computer program code,
the at least one memory and computer program code configured, with the at least one processor, to cause the apparatus at least to
receive a time division duplex (TDD) uplink/downlink (UL/DL) configuration indication pattern for indicating multiple TDD UL/DL configurations in downlink control information (DCI) format 1C, wherein each of the TDD UL/DL configurations is associated with certain configured carriers and a concrete fixed downlink subframe index,
wherein the configuration indication pattern comprises a mapping relationship between the TDD UL/DL configurations in one DCI format 1C in one fixed downlink subframe and the carrier index.

14. The apparatus according to claim 13, wherein the at least one memory and computer program code are configured, with the at least one processor, to cause the apparatus at least to transmit the DCI format 1C in a fixed downlink subframe to indicate multiple TDD UL/DL configurations for the associated certain configured carriers.

15. The apparatus according to claim 13, wherein up to five carriers are supported in the DCI format 1C in one or more downlink subframes.

16. The apparatus according to claim 13, wherein the at least one memory and computer program code are configured, with the at least one processor, to cause the apparatus at least to indicate in at least one of downlink subframe #0, #1, #5, or #6 the TDD UL/DL configurations for all of the configured carriers.

17. The apparatus according to claim 13, wherein the at least one memory and computer program code configured, with the at least one processor, to cause the apparatus at least to configure the TDD UL/DL configuration indication pattern using radio resource control (RRC) signaling.

* * * * *